(12) United States Patent
Driemeyer et al.

(10) Patent No.: US 11,778,093 B1
(45) Date of Patent: *Oct. 3, 2023

(54) APPARATUSES AND METHODS INVOLVING AN INTEGRATED CONTACT CENTER

(71) Applicant: 8x8, Inc., Campbell, CA (US)

(72) Inventors: Justin Driemeyer, Campbell, CA (US); Manu Mukerji, Campbell, CA (US); Vijai Gandikota, Campbell, CA (US); Soumyadeb Mitra, Campbell, CA (US); Solomon Fung, Campbell, CA (US); Arunim Samat, Campbell, CA (US); Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,612

(22) Filed: Sep. 6, 2022

Related U.S. Application Data

(63) Continuation of application No. 16/822,760, filed on Mar. 18, 2020, now Pat. No. 11,445,063.

(60) Provisional application No. 62/820,153, filed on Mar. 18, 2019, provisional application No. 62/820,166, filed on Mar. 18, 2019, provisional application No. 62/820,149, filed on Mar. 18, 2019, provisional application No. 62/820,160, filed on Mar. 18, 2019.

(51) Int. Cl.
*H04M 3/493* (2006.01)
*H04M 3/523* (2006.01)
*H04L 51/046* (2022.01)

(52) U.S. Cl.
CPC ........ *H04M 3/4933* (2013.01); *H04L 51/046* (2013.01); *H04M 3/4936* (2013.01); *H04M 3/5233* (2013.01); *H04M 3/5237* (2013.01); *H04M 2203/10* (2013.01)

(58) Field of Classification Search
CPC ............. H04M 3/4933; H04M 3/5233; H04M 3/5237; H04M 2203/10; H04L 51/046
USPC ................................................... 379/218.01
See application file for complete search history.

(56) References Cited

U.S. PATENT DOCUMENTS

| | | | |
|---|---|---|---|
| 2007/0033078 A1* | 2/2007 | Mandalia ............ | G06Q 10/109 235/379 |
| 2010/0226490 A1* | 9/2010 | Schultz ............... | H04M 3/5233 379/265.09 |
| 2018/0054523 A1* | 2/2018 | Zhang ............... | G06F 16/90332 |

* cited by examiner

*Primary Examiner* — Jirapon Tulop
(74) *Attorney, Agent, or Firm* — Crawford Maunu PLLC

(57) ABSTRACT

Apparatuses and methods concerning providing a data-communications virtual assistant are disclosed. As an example, one apparatus includes a data-communications server. The data-communications server is configured to process user-data-communications between a client station and another station participating in data-communications via the data-communications services where the client station is associated with one client entity. The server is also configured to identify a context for each respective user-data-communication between the client station and the participating station, where the context data corresponds to at least one communications-specific characteristic associated with the user-data-communications, and to retrieve structured and unstructured data relating to previous data-communications provided by the data-communications server. The server is also configured to provide the integrated contact center to particular end users based on the identified context, and including data generated from the retrieved structured and unstructured data.

21 Claims, 6 Drawing Sheets

APPARATUSES AND METHODS INVOLVING AN INTEGRATED CONTACT CENTER

OVERVIEW

Various example embodiments are directed to apparatuses, systems, methods of use, methods of making, or materials, such as those described in the claims, description or figures herein, all of which form part of this patent document.

Various embodiments are directed to addressing challenges relating to aggregating information from a plurality of data-communications systems to provide an integrated contact center. Accordingly, various embodiments are directed to a variety of apparatuses, methods, components and/or related systems comprising or related to providing an integrated contact center, including a data-communications server configured and arranged to process user-data-communications between a client station and another station participating in data-communications via the data-communications services. In such example embodiments, the client station is associated with one of the client entities, and the data-communications server may identify a context (e.g., criticality and sentiment) for each respective user-data communication between the client station and the participating station, where the context information corresponds to at least one communications-specific characteristic associated with the user-data-communications. The data-communications server further retrieves structured and unstructured data (such as chat communications, calls, transcripts, service tickets, sales tickets, and call detail records, etc.) relating to previous data-communications provided by the data-communications server, and provides an integrated contact center to particular end users based on the identified context, and including data generated from the retrieved structured and unstructured data.

Some embodiments are directed to addressing challenges relating to identifying a particular data-communications room among a plurality of data-communications rooms for a particular user and/or inquiry. The particular topic of a data-communications room may not be readily apparent from the available resources. Some rooms may have titles that may be at least somewhat descriptive or suggestive (e.g., tradenames) of their topic but some may not, and private/internal terminology (e.g., internal project names/ inside jokes) may be used as room titles. Additionally some rooms or conversations may not be particularly useful for particular individuals. Rooms that begin with a particular communication topic may evolve and the content of the room may no longer be relevant to a particular user. Conversely, a room that was not previously relevant to a particular user may become relevant over a period, as the content of the room evolves over time. The activity that takes place in a room may change over time based on a room's relevancy to users.

Certain embodiments are directed to addressing challenges relating to aggregating information from a plurality of data-communications systems to provide a data-communications virtual assistant. Accordingly, various embodiments are directed to a variety of apparatuses, methods, components and/or related systems comprising or related to a data communications virtual assistant, including a data communications server configured and arranged to process user-data communications between a client station and another station participating in data communications via the data communications server, where the client station is associated with one of the client entities, and identifies a context (e.g., criticality and sentiment) for each respective user-data communication between the client station and the participating station, where the context corresponds to at least one communications-specific characteristic associated with the user-data communications. In such example embodiments, the data-communications server may apply call routing based on the identified topic context (e.g., criticality and sentiment). In various embodiments, the data-communications server may identify critical calls among a plurality of data-communications, and/or identify a sentiment for each communication among the plurality of data-communications. The data-communications server may identify an importance for each respective individual (e.g., caller) involved in the data-communication, and route the call based on the identified importance of the individual. Moreover, the data-communications server may be configured and arranged to route communications based on a determined topic and criticality.

In accordance with various aspects of the disclosure, a data-communications contact center virtual agent apparatus includes communications circuitry configured to communicate with respective stations, and a data communications server configured and arranged with the communications circuitry to facilitate communications as follows. User-data-communications between a client station and participant stations are processed, with the stations participating in data-communications via the client station, and with the client station being associated with a client entity. Input service request data is obtained from users at the participant stations. Context information is identified for each respective user-data-communication between the client station and the participating stations based on the service request data at least one communications-specific characteristic associated with the user-data-communications, and the identified context information is aggregated for the client station. For a user-data-communication from one of the participant stations, a data communications routing option is chosen for routing data with the one of the participant stations based on the service request data and the aggregated context information, and data communications are routed with the one of the participant stations in accordance with the chosen data communications routing option.

Certain embodiments are directed to addressing challenges relating to aggregating information from a plurality of data-communications systems to provide a contact center virtual agent. Accordingly, various embodiments are directed to a variety of apparatuses, methods, components and/or related systems comprising or related to providing a contact center virtual agent, including a data-communications server configured and arranged to process user-data communications between a client station and another station participating in data communications via the data-communications services. In such example embodiments, the client station is associated with one client entity, and the data-communications server may identify a context (e.g., criticality and sentiment) for each respective user-data communication between the client station and the participating station, where the context corresponds to at least one communications-specific characteristic associated with the user-data communications. In such embodiments, the data-communications server may learn from frequently asked questions and answer inquiries from another user without the involvement of a live agent, and provide a data-communications virtual assistant based on the identified context and frequently asked questions, and answer inquiries from another user.

Certain embodiments involve apparatuses, methods, systems, circuitries, and the like as exemplified in the following diagrams, and/or the claims.

BRIEF DESCRIPTION OF FIGURES

Various example embodiments may be more completely understood in consideration of the following detailed description in connection with the accompanying drawings, in which.

Figure 1:
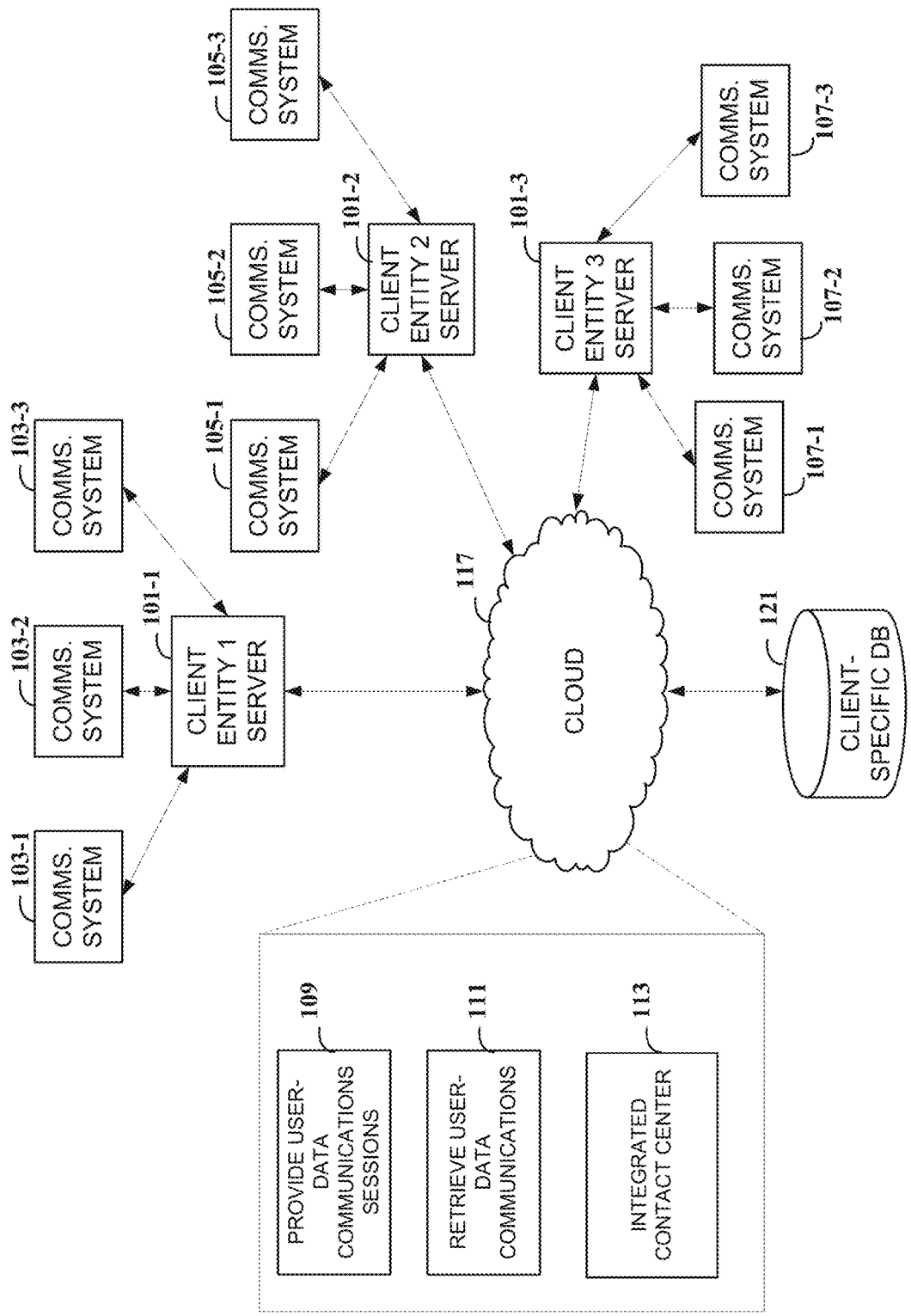
FIG. 1 illustrates a block diagram of an example system for an integrated contact center, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing an integrated contact center. In certain implementations, aspects of the present disclosure have been shown to be beneficial when used in the context of providing data-communications services. While the present disclosure is not necessarily limited to such data-communications systems as described herein, for purposes of facilitating understanding and appreciation of certain embodiments, the following discussion uses such data-communications-based services and systems in the context and on behalf of communications platforms of client entities which subscribe to such services from a data-communications service provider (with a server).

Embodiments are directed toward methods for use in communications systems employing a data-communications server operated by a communications provider, where the data-communications server is on the data-communications provider side, to provide data-communications services to a multitude of client entities. For instance, the data-communications server can provide data-communications sessions each involving a client-specific endpoint device and another participating endpoint device, where the client-specific endpoint device is associated with a client-entity among the plurality of remotely-situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session can include transmission and receipt of data-communications between at least two endpoint devices, as hosted (e.g., provided) by the data-communications server.

In one non-limiting example embodiment, the data-communications server can identify a context (e.g., criticality and sentiment) for each respective user-data-communication between the client station and the participating station, where the context information corresponds to at least one communications-specific characteristic associated with the user-data-communications.

In various example embodiments, the data-communications server retrieves structured and unstructured data (such as chat communications, calls, transcripts, service tickets, sales tickets, and call detail records, etc.) relating to previous data-communications provided by the data-communications server, and provides an integrated contact center to particular end-users based on the identified context, and including data generated from the retrieved structured and unstructured data. In such example embodiments, the integrated contact center provides to users of a particular client station, an available selection of one or more of the following non-limiting features/services: a virtual office assistant, contact center assistant, and a room prediction engine based on the identified context, and including data generated from the retrieved structured and unstructured data.

In some embodiments involving providing the room prediction engine, the data-communications server is configured and arranged to batch, for each of a plurality of data-communications rooms in which ones of the stations participate in the data-communications, ones of data-communications messages communicated between the stations together to create a room document. Responsive to receipt of a request from a particular user, a particular data-communications room is identified among the plurality of data-communications rooms for the request, based on a comparison of the room document for the particular data-communications room and the request from the particular user.

In one or more embodiments involving providing the virtual assistant, the data-communications server is configured and arranged to apply call routing based on the aggregated context data, which includes communications from the client station to another one of the respective stations.

For embodiments involving providing a contact center assistant, the data-communications server obtains input service request data from users at ones of the respective stations including the participating station, and identifies the context data based on the service request data. The data-communications server further operates to choose, for a user-data-communication from one of the respective stations, a data-communications routing option for routing data with the one of the respective stations based on the service request data and the aggregated context data, and route data-communications with the one of the participant stations in accordance with the chosen data-communications routing option. In some implementations, the data-communications server is configured to choose the data-communications routing option for routing data with the one of the respective stations by choosing a predefined communication for routing in response the service request data specifying a question, and to route the data-communications with the one of the respective stations in accordance with the chosen data-communications routing option by routing data that provides a response to the question. In other implementations, the data-communications server is configured to choose the data-communications routing option for routing data with the one of the respective stations by selecting an agent based on the service request data characterizing the identified context data, and to route data-communications between the one of the respective stations and the selected agent in accordance with the chosen data-communications routing option.

Various embodiments are directed to method-based aspects as characterized herein, including those noted above in regard to the data-communications server and provision of features/services involving the a virtual office assistant, contact center assistant, and room prediction engine as noted.

In some example embodiments, responsive to receipt of a request from the particular user, the data-communications server may identify a particular data-communications room among a plurality of data-communications rooms for a particular inquiry, based on the identified context and the retrieved structured and unstructured data. Additionally and/or alternatively, the data-communications server may provide a data-communications virtual assistant based on the identified context, and including data generated from the retrieved structured and unstructured data. In some example embodiments, the data-communications server is configured and arranged to provide a data-communications virtual assistant based on the identified context, wherein the data-communications virtual assistant schedules meetings and/or appointments based on the identified context information and the retrieved structured and unstructured data. Additionally and/or alternatively, the data-communications virtual assistant can reschedule meetings and/or appointments based on the identified context information and the retrieved structured and unstructured data.

In various example embodiments, the data-communications server is configured and arranged to provide a data-communications virtual assistant based on the identified context, wherein the data-communications virtual assistant applies call routing based on the identified topic context (e.g., criticality and sentiment) and the retrieved structured and unstructured data. Additionally, using the integrated contact center, the data-communications server may provide a contact center virtual assistant based on the identified context. The contact center virtual assistant learns from frequently asked questions and answer inquiries from another user without the involvement of a live agent, and provides a contact center virtual agent based on the identified context and frequently asked questions and answer inquiries from the another user.

In various additional embodiments, the contact center virtual assistant identifies the context of the communication and skills associated with a particular agent, and matches an incoming communication with a particular agent based on the identified skills and the context of the communication. The data-communications server may learn from frequently asked questions and answer inquiries from another user without the involvement of a live agent, and may provide a contact center virtual agent based on the identified context and frequently asked questions and answer inquiries from the another user. As another illustration, the data-communications server may identify the context of the communication and skills associated with a particular agent, and match an incoming communication with a particular agent based on the identified skills and the context of the communication.

Additionally and/or alternatively, the data-communications server provides recommendations to the agent during the communication based on the identified context. The data-communications server may, via the contact center virtual agent, provide recommendations to the agent during the communication as a visual indicator on a graphical user interface (GUI), based on the identified context. In some example embodiments, the data-communications server may provide recommendations to the agent during the communication as an auditory instruction, based on the identified context. For instance, the data-communications server may identify the context of the communication during the communication, and provide recommendations to the agent regarding how to address the particular communication. The data-communications server may, via the contact center virtual agent, provide recommendations on the particular answer for the communication, individuals and/or groups to route the particular communication. Similarly, the data-communications server may, via the contact center virtual agent, identify in real time, a topic of the communication and feed the identified topic into the contact center virtual agent for real time recommendations on handling the communication.

In various example embodiments, the contact center virtual assistant may provide call deflection and real time agent assistance. The contact center virtual assistant may implement a dual flow live agent assist, and act as a session initiation protocol (SIP) gateway by routing calls to a dialog flow, translating the SIP communication into a remote procedure call (such as GRPC) and back to SIP. The contact center virtual assistant may plug in multiple speech to text (STT) or text to speech (TTS) modules, and rate the accuracy of the translated language. Moreover, the data-communications server, via the contact center virtual assistant, may identify topics in real time, and feed the identified topics into a multivalue database (such as a QM™ product).

In additional non-limiting embodiments, the data-communications server may, via the contact center virtual assistant, implement a knowledgebase classifier capable of taking a question that a caller has asked and identify one and only one answer. As such, the contact center virtual assistant may collect question and answer pairs from support websites, cluster the question and answer pairs to remove related ones, and use some distance metrics to determine distance between user query and questions. The data-communications server may, via the contact center virtual assistant, use a defined threshold to match question and answer pairs to the user query, and/or to provide the particular answer to an agent for live assistance, as described herein.

Each of the room prediction engines, the virtual office assistant, and the contact center assistant may be provided by the data-communications server, and may be accessible by users via a graphical user interface of a particular client station. Each of the respective services may be provided to the user together or independent from one another, and may integrate the data generated from the retrieved structured and unstructured data as well as the identified context information.

Embodiments are directed toward methods and/or apparatuses for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

Generating data-communications room predictions, in accordance with various example embodiments described herein may include identifying rooms where topics may not be readily apparent from the available resources. Some rooms may have titles that are descriptive, whereas some are not. Additionally, inside names (e.g., private nicknames and/or inside jokes) may be used as room titles. Generating data-communications room predictions, in accordance with various example embodiments described herein may filter out rooms or conversations that are not useful and/or relevant, and may take and/or adopt content from one room versus sections of the conversations. Moreover, generating data-communications room predictions, in accordance with various example embodiments described herein, may consider historical data in order to provide a room recommendation from or to a user, a client and/or a subject matter expert.

As topics may be very domain specific, and use of tribal abbreviations and terms may be common, pre-trained results from other datasets (e.g., Wikipedia) may not be beneficial. Important and/or highly relevant words may sometimes be used very infrequently or insubstantially in the dataset, relative to a threshold, and incorrect recommendations may be provided. Furthermore, generating data-communications room predictions having or starting with no existing dataset for topic queries, for example, may be accomplished. Moreover, interactions that an author, or user, may have with a room may also generate a room recommendation. Accordingly, examples of the present disclosure provide a system for recommending data-communications rooms and/or individuals where a particular user may find additional relevant information related to a query. For instance, a user may be interested in finding a subject matter expert related to a particular computer programming language. The data-communications server may categorize various data-communications rooms, and identify a room and/or particular individual that relates to the particular computer programming language in order to connect the particular user with the particular room and/or the subject matter expert.

In accordance with examples of the present disclosure, systems, methods, and/or apparatuses for generating data-communications room predictions include a communications system involving a data-communications server and a client-managed server, and/or a method of providing aggregated context information for data-communications between the data-communications server and the client-managed server. In such example embodiments, the data-communications server is configured and arranged to provide user data-communications sessions each involving a client-specific endpoint device and another participating endpoint device, where the client-specific endpoint device is associated with a client-entity among a plurality of remotely-situated client entities each respectively configured and arranged to interface with the data-communications server. These data-communications sessions may be attributed to a particular data-communications room or independent of any data-communications room (e.g., prior to being assigned to such a room). The data-communications server retrieves user-data communications (messages) between the client-specific endpoint device and the other participating endpoint device during a first time period. The messages may be retrieved, for example from a plurality of disparate interconnected data-communications systems that provide at least one data-communications service to the client entity on a subscription basis.

The data-communications server batches the data-communications messages for a particular data-communications room together to create a room document for each of a plurality of data-communications rooms. Responsive to receipt of a request from the particular user, the data-communications server identifies a particular data-communications room among the plurality of data-communications rooms for a particular inquiry, based on a comparison of the room document for the particular data-communications room and the request from the particular user. In some example embodiments, the request may be in the form of a formal request from the particular user, such as an inquiry from the user to identify a subject matter expert on a particular subject and/or in a particular field. Examples are not so limited, however, and the request may be in the form of a search engine that identifies topic and/or issues facing the particular user at the particular time, and which provides a recommendation to the particular user based on the present topics and/or issues facing the particular user.

As an illustration, the data-communications server may be configured and arranged to take messages, and filter out known stop words as well as application-specific stop words (e.g., help, issue, question, etc.). The data-communications server may filter out any rooms where 95% of messages were from two or fewer authors, which removes rooms that are mostly just conversations between two people, as well as many testing and/or logging rooms. The data-communications serve may filter out any rooms and/or people with fewer than five messages, for example, which addresses rooms that never really took off. The data-communications server may filter out rooms where the difference between the first and last message was less than or equal to a particular threshold (e.g., 5 days), which removes rooms that were used around a specific event, or addressing a hot issue, for example, but were not intended to be used beyond that. In these and other contexts, the term filter out may refer to removing or otherwise electing to not use particular data sets, rooms, words conversations.

In various example embodiments, the data-communications server is configured and arranged to batch all messages for a room together to create a single room document. The data-communications server is configured and arranged to create a classifier for this, which tries to learn characteristics of what, overall, a room is about. In this context, what a room is about may refer to one or more of a variety of characteristics of the room, such as content-related characteristics as may involve topics of discussion, key words, media characteristics (e.g., imagery and/or audio), as well as other characteristics such as longevity of the room, size, and room participant details such as demographics, age, race, political affiliation, income, and location. Further, the classifier may adjust such characteristics over time, such as to ensure that a time-domain view can be made of a particular room to ensure that classification reflects current room characteristics. Such a classifier may be referred to as a long-term room content classifier.

In some embodiments, this classifier is identified using cosine similarity between a term frequency-inverse document frequency (tf-idf) encoding of the document and a query vector (e.g., a query vector as may be identified and/or received from the particular user and/or on the user's behalf). A tf-idf is a numerical statistic that may reflect how important a word is to a document in a collection or corpus and may increase, for example, proportionally to the number of times a word appears in the document. In such embodiments, cosine similarity may be used to match similar documents based on a counting of a number (e.g., maximum) of common words between the documents, and which may involve comparing respective vectors representing topics and may do so independently of the magnitude of those vectors. Vectors that are common in respective room documents (while perhaps being different in magnitude) may indicate similarity as such.

In various example embodiments, the data-communications server may be configured and arranged to subdivide the single room documents into batches of a plurality of messages, such as 100 messages, for example, so that rooms will have n/100 documents, where n is the number of messages in that room. The data-communications server may train a classifier on those batched messages to predict a room, and may give higher weight to more recent documents. Accordingly, as topics/words discussed in a room may change over time, the data-communications server may update characteristics of the room accordingly with a time-based evaluation. A classifier may thus be implemented relative to a recent timeframe, and may be referred to as providing a short-term room content score. The data-communications server may identify the short-term room content score using tf-idf encoding of the documents and feeding them into a dense neural net in a predictive engine including natural language processing and probabilistic programming, which predicts the respective data-communications room for the particular user. Various embodiments may utilize machine learning libraries such as open source libraries PyTorch, useful with high-level or natural language processing.

In some example embodiments, the data-communications server may combine the long-term room content classifiers and the short-term room content classifier for each respective data-communications room into an ensemble classifier, take the geometric mean of the score of each respective classifier, and generate a room content score for each respective data-communications room. Combining the classifiers may involve, for example, combining some or all characteristics used for each of the long-term and short-term room classifiers into a new (ensemble) classifier.

In some example embodiments, the data-communications server may train a room metadata classifier, using a room name, description or other available room metadata, and generate a room metadata score from the room metadata classifier. In various example embodiments, the room metadata score may be generated using a cosine similarity between a tf-idf encoding of a room name and a query vector. A query vector may include, for example, information from an enquiry about a particular topic as may be provided by a user desiring a match/room for satisfying the enquiry.

In some example embodiments, the data-communications server may combine the room content score and the room metadata score by taking the arithmetic mean of the score of each, and generate a room prediction score from the combined scores. Thereby, the data-communications server may identify the particular data-communications room for the particular user based on the room prediction score.

In some example embodiments, the data-communications server may crawl links included in messages, and pull in the content of the documents referenced and include that in training data. This may bring in trouble-shooting tickets (e.g., JIRA tickets via JIRA software 8.5.1 available from Atlassian of Sydney, Australia), product requirement documents in an integrated word processor (e.g., Google Docs™), customer support tickets, etc.

In some example embodiments, the data-communications server may look at or examine what questions have been asked and who responded to them as an additional dataset for learning subject matter experts. This may involve, for example, questions provided by certain users and answered by others, such as for answering by experts in various fields, in which the experts serve a particular entity via which the users are submitting enquiries. For instance, where users enter technical questions, these questions may be used to create a room or expert score that identifies a room or expert likely to assist in addressing the technical questions. This may be based on classification such as may be characterized herein. In some example embodiments, the data-communications server may implement an entire model in a predictive engine including natural language processing and probabilistic programming (such as PyTorch) that then predicts the respective data-communications room for the particular user and allows the engine to learn the weights for the different models in the ensemble.

In some example embodiments, the data-communications server may use an identification of room participants/contributors to train a room model, and to use an identification of rooms in which participants are involved to help train a person model. Additionally, the data-communications server may pull in other data to train the person model (e.g., engine), as may include information pertaining to job title, meetings attended, meetings hosted, confluence document authored, service tickets authored, and service tickets worked on.

Embodiments are directed toward methods and/or apparatuses for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities.

Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

Identifying critical communications (including calls), the sentiment of a communication, and identifying "caller" importance are all relevant to providing a data-communications virtual assistant. Examples for call routing based on topic criticality and sentiment include a spreadsheet and a unique representation of the entity (e.g., as may involve JavaScript Object Notation (JSON)) and involve a representation denoted PersonCallFlow with sub entities for rules and topic priorities based on context. The context may be built by taking into account caller priority, criticality, sentiment and caller background (e.g., company, industry, history, etc.).

Difficulty may arise with regards to incorporating additional data (e.g., salesforce data) and identifying topics and cross-training to use that data for calls and for call routing. Additionally, implementations may be directed toward pulling a call back to voicemail (internal and external numbers) for various subsequent handling processes.

In various example embodiments, providing a data-communications virtual assistant allows users to search for relevant slots for a meeting and/or an appointment when a calendar slot is busy. Additionally, providing a data-communications virtual assistant allows users to utilize the expertise and skills from a data-communications room recommender or predictor to route calls or prioritize whom the call should be sent to. The virtual assistant described herein may identify (e.g., figure out) if an alternate caller is available or not, and may learn from the experience of the caller answering the call.

In some example embodiments, the virtual assistant described herein may determine whether the call (e.g., communication) resolution was made, what was the action (if there was one), if there was a follow-up call, etc. For instance, the virtual assistant may launch a postcall analysis engine, which disregards agent feedback and analyzes the call (e.g., data-communication) independent of agent bias to determine if a resolution was made or not. Additionally, the virtual assistant can inform the original calling person if the query of the caller was resolved or not.

In accordance with examples of the present disclosure, systems, methods, and/or apparatuses for providing a data-communications virtual assistant may automatically generate the rules (e.g., routing and notification rules) based on learning of patterns of answering calls. As one example, a method for providing a data-communications virtual assistant may proceed as follows:
1. Call forwarded to targeted VOD-related central processing unit (CPU) terminal ("VOD" referring to a virtual office desktop)
2. No pickup
3. Forwarded to script8
4. CreateSession
   4a: Session state (caller, phone #, session_id saved in DB ("database"))
5. Forwarded to Dialogflow Agent via gateway
   5a: Booking Appointment Intent (interfaces with calendar API)
   5b: Fallback Routing Intent. Calls into Topic & Criticality ML APIs & Routing Table
   5c: Session DB updated with matched intent, routing recipient
6. GetSession—Script8 gets session state from DB
   6a: To decide if terminate call OR route call
7. Call is forwarded (in case routing intent matched)
8. VoiceMail—If 7 doesn't pickup, voicemail captured in script8

In accordance with examples of the present disclosure, systems, methods, and/or apparatuses for providing a data-communications virtual assistant include a communications system involving a data-communications server and a client-managed server. In such example embodiments, the data-communications server is configured and arranged to provide user-data-communications sessions, each involving a client-specific endpoint device and another participating endpoint device, where the client-specific endpoint device is associated with a client-entity among a plurality of remotely-situated client entities each respectively configured and arranged to interface with the data-communications server. The data-communications server retrieves from a plurality of disparate interconnected data-communications systems, user-data-communications between the client-specific endpoint device and the other participating endpoint device during a first time period, where the data communications systems each provide at least one data-communications service to the client entity on a subscription basis. The data-communications server further identifies a context (e.g., criticality and sentiment) for each respective user-data-communication between the client station and the participating station, where the context information corresponds to at least one communications-specific characteristic associated with the user-data-communications, and applies call routing based on the identified topic context (e.g., criticality and sentiment).

As an illustration, the data-communications server may be configured and arranged to identify critical calls among the plurality of data-communications, identify a sentiment for each communication among the plurality of data-communications, identify an importance for each respective individual (e.g., caller) involved in the data-communication, and route communications based on topic criticality, sentiment, and/or importance. In some example embodiments, the data-communications server may generate a list of a unique JSON representation of each respective entity: PersonCallFlow with sub entities for Rules and Topic priorities based on context, and build a context by taking into account caller priority, criticality, sentiment and caller background (e.g., company, industry, history etc.). In some example embodiments, the data-communications server may apply call routing based on caller identification (caller id) disambiguation (e.g., name, social profiles, etc.) in response to an indication that the person calling is not recognized by the data-communications server. Additionally, the data-communications server may schedule meetings and/or appointments based on the identified context information and using aggregated information from a plurality of data-communications services, as well as reschedule meetings and/or appointments based on the identified context information and using aggregated information from the plurality of data-communications services. Additionally and/or alternatively, the data communications server may provide extra information for upcoming meetings, appointments, and/or communications based on the identified context information and using aggregated information from the plurality of data-communications services.

In various example embodiments, providing a data-communications virtual assistant includes curating a dataset of various emotions (e.g., happy, sad, etc.) for a plurality of (e.g., 1000+) audio clips randomly taken from customer service data, and trimming the clips to short (e.g., 30 second) sections after agents ask various questions such as "what are you calling about?" The virtual assistant described herein may use a vggish network (referring to a Visual Geometry Group (VGG) or similar network) with the prediction layer trimmed off to get the final embedding layer, and generated embeddings for all the 500 audio clips. The virtual assistant may then train a logistic regression model with the vggish embeddings, and test the model on a test dataset (200 samples with even distribution of the labels). Results yield around 65% accuracy with ~70% precision. For more information regarding such VGG-like software modeling/network (or vggish), reference may be made to Google-provided resources such as at https://research.google.com/audioset/download.html (explaining that VGG-like model may be used to generate the 128-dimensional features (VGGish) as available in the TensorFlow models Github repository, along with supporting code for audio feature generation, embedding post-processing, and demonstrations of the model in inference and training modes). See also YouTube-8M starter code for how to train models on the released features from both AudioSet as well as YouTube-8M, and YouTube-8M GitHub repository.

Embodiments are directed toward apparatuses and methods for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely-situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

In a non-limiting example embodiment, the data-communications server may identify a context (e.g., criticality and sentiment) for each respective user-data-communication between the client station and the participating station, where the context corresponds to at least one communications-specific characteristic associated with the user-data-communications. Additionally, the data-communications server may learn from frequently asked questions and answer inquiries from another user without the involvement of a live agent, and provide a contact center virtual agent based on the identified context and frequently asked questions and answer inquiries from another user. As another illustration, the data-communications server may identify the context of the communication and skills associated with a particular agent, and match an incoming communication with a particular agent based on the identified skills and the context of the communication.

Additionally and/or alternatively, the data-communications server may integrate an intelligent contact center to provide call deflection and real time agent assistance. For instance, provide recommendations to the agent during the communication based on the identified context. The data-communications server may, via the contact center virtual agent, provide recommendations to the agent during the communication as a visual indicator on a graphical user interface (GUI), based on the identified context. In some example embodiments, the data-communications server can provide recommendations to the agent during the communication as an auditory instruction, based on the identified context. For instance, the data-communications server may identify the context of the communication during the communication, and provide recommendations to the agent regarding how to address the particular communication. The data-communications server may, via the contact center virtual agent, provide recommendations on the particular answer for the communication, individuals and/or groups to route the particular communication. Similarly, the data-communications server may, via the contact center virtual agent, identify in real time, a topic of the communication and feed the identified topic into the contact center virtual agent for real time recommendations on handling the communication.

In various example embodiments, the contact center virtual assistant may provide call deflection and real time agent assistance. The contact center virtual assistant can implement a dual flow live agent assist, and act as a session initiation protocol (SIP) gateway by routing calls to a dialog flow, translating the SIP communication into a remote procedure call (such as GRPC) and back to SIP. The contact center virtual assistant may plug in multiple speech to text (STT) or text to speech (TTS) modules, and rate the accuracy of the translated language. Moreover, the data-communications server, via the contact center virtual assistant, may identify topics in real time, and feed the identified topics into a multivalue database (such as a QM™ product).

In additional non-limiting embodiments, the data-communications server may implement, via the contact center virtual assistant, a knowledgebase classifier capable of taking a question that a caller has asked and identify one and only one answer. As such, the contact center virtual assistant may collect question and answer pairs from support websites, cluster the question and answer pairs to remove related ones, and use some distance metrics to determine distance between user query and questions. The data-communications server may use, via the contact center virtual assistant, a defined threshold to match question and answer pairs to the user query, and/or to provide the particular answer to an agent for live assistance, as described herein.

In accordance with various aspects of the disclosure, an apparatus facilitates a data-communications contact center virtual agent. The apparatus includes communications circuitry that communicates with respective stations, and a data communications server that operates with the communications circuitry to process user-data-communications between a client station and participant stations. The stations participate in data-communications via the client station, which is associated with a client entity, and input service request data is obtained from users at the participant stations. Context information is identified for user-data-communications between the client station and the participating stations, based on the service request data at least one communications-specific characteristic associated with the userdata-communications. For instance, context information may relate to user input specifying an issue, question or other need to be serviced and other information relating to the instant or other user data communications involving the user and/or other users. The identified context information is aggregated for the client station, and can be used in a variety of manners. For instance, in a user-data-communication from one of the participant stations, a data communications routing option may be chosen for routing data with the one of the participant stations based on the service request data and the aggregated context information. Data communications may then be routed with the one of the participant stations in accordance with the chosen data communications routing option.

Routing data, such as by routing a voice connection, text data, or image data may be effected in a variety of manners. In certain implementations, the data communications routing option may be chosen using a predefined communication for routing to the participant station in response the service request data specifying a question (e.g., where the question may be associated with a type or group of questions or topics). Accordingly, the data communications may be routed in accordance with the chosen data communications routing option by routing data that provides a response to the question.

In some embodiments, the routing option is chosen selecting an agent based on the service request data characterized the identified context information, and communications are routed between the one of the participant stations and the selected agent in accordance with the chosen data communications routing option. Context may be learned from a particular user station via which the routing is effected, or from a variety of user stations that may or may not be related. For instance, the agent may be selected based the context information for the user-data-communications with a plurality of the other participant stations, which may facilitate identifying a particular agent that/who has addressed a particular question or topic. In certain implementations, historical context information is aggregated for a plurality of agents to facilitate characterization of each agent's skills, and an agent may be selected based on such aggregated historical context information (e.g., relative to other agents).

The routing option may also be chosen based on a question and learned context information for a particular user posing the question. For instance, an agent may be selected for routing based on the service request data and data associated with a user at the participant station, as characterized in the identified context information. Data communications can thus be routed between the participant station and the selected agent.

In certain more particular implementations, data is routed between a user and an agent that is selected based on user input, context information for the user providing the input, and the agent's skills. For instance, the agent may be selected from a plurality of agents based on capabilities of the agents and aspects of the context data characterizing the service request data, as well as data associated with the user at the participant station via which the request is generated. Data communications can then be routed accordingly, between the one of the participant stations and the selected agent in accordance with the chosen data communications routing option. Capabilities of the agents may be defined based on aspects of the context information corresponding to previously routed data communications with the agents.

Context information may be identified in a variety of manners. For instance, data characterizing historical interactions with a particular user at a participant station may be used to identify the context information for a current communication involving that user. Context information may be identified, for instance, based upon a topic of communication identified in real time, from a participant station for which routing is effected. Identified context information may be aggregated for previous communications from a user at the one of the participant stations. For example, when a user contacts a help center to address an issue (e.g., a computer software problem), context information for the associated communication can be stored. When that user contacts the help center again, the stored context information from the previous communication (or multiple such communications) can be aggregated and utilized in choosing the data communications routing option.

In certain embodiments involving data communications routing to agents, capabilities of respective agents with which the data communications are routed may be characterized based on aspects of the context information corresponding to previously routed data communications with the agents. User data communications that designate a particular one of the agents may be deflected to another one of the agents, based on the characterized capabilities of the agents.

In certain embodiments, agents are selected and connected with a user at the participant station for routing based on an identified context as characterized herein, with the context being further used to provide recommendations to the selected agent during the data communications. For instance, where a context may relate to a certain topic, recommendations corresponding to the topic may be provided to the selected agent. Such recommendations may be provided to the selected agent as a visual indicator on a graphical user interface and/or as auditory instruction.

The embodiments and specific applications discussed herein may be implemented in connection with one or more of the above-described aspects, embodiments and implementations, as well as with those shown in the figures, which are fully incorporated herein by reference.

Turning now to the figures, FIG. 1 illustrates a block diagram of an example system for providing an integrated contact center, consistent with the present disclosure. Data-communications services may be provided for a plurality of client entities, such as via a data-center communications server. Each client entity may provide the data-communications services to various endpoint devices, as may be implemented in a distributed computing environment. For instance, as illustrated in FIG. 1, a data-center communications server may host via cloud 117. A plurality of client entities may access the data-center communications server via the cloud 117, such as by a respective client entity server (e.g., client entity 1 server 101-1, client entity 2 server 101-2, and client entity 3 server 101-3).

Each of the respective client entities may be connected in one or more data networks as discussed further herein. Moreover, each of the respective client entity servers 101-1, 101-2, and 101-3 may be communicatively coupled to a plurality of communications systems. For example, client entity 1 server 101-1 may be communicatively coupled to communications systems 103-1, 103-2, and 103-3. Similarly, client entity 2 server 101-2 may be communicatively coupled to communications systems 105-1, 105-2, and 105-3. Further, client entity 3 server 101-3 may be communicatively coupled to communications systems 107-1, 107-2, and 107-3.

Although not illustrated in FIG. 1, each of the client entity servers may be communicatively coupled to a number of endpoint devices. The endpoint devices may include datacommunications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data-communications server. Registered devices for each client account may be listed in a respective account settings file (not shown) stored by a data-center communications server.

The system illustrated in FIG. 1 further includes one or more processing circuits configured to implement client-specific control engines, which are configured to adjust the data-communications provided for each client account according to a respective set of control directives. For instance, the client-specific control engines may adjust a manner in which endpoint devices are controlled, and/or a manner of routing of data-communications for a client account, by accessing client-specific sets of control data stored in at least one client-specific database 121.

The server-based communications system illustrated in FIG. 1 may facilitate providing a contact center virtual assistant, consistent with the present disclosure. In various exemplary embodiments, a contact center virtual assistant may be provided by a data-center communications server. Additionally and/or alternatively, a contact center virtual assistant may be provided by a client managed server. In either situation, at 109, user-data-communications sessions each involving a client-specific endpoint device and another participating endpoint device may be provided, where the client-specific endpoint device is associated with a client-entity among a plurality of remotely-situated client entities each respectively configured and arranged to interface with the data-communications server. For instance, the data-communications server may provide to each of client entity 1, client entity 2, and client entity 3, data-communications services as described herein. Subsequently, at 111, user-data-communications between the client entity and the other party may be retrieved from a plurality of interconnected data-communications systems for a first time period. A context may be determined for each respective user-data-communication between the client entity and the other party during the first time period, as described herein. The identification of the context of communications during the first time period may assist with the development of the client-specific database 121, and enable machine learning to assign a context to subsequent user-data-communications. As such, a plurality of user-data-communications between the client entity and the other party may be aggregated.

At 113, an integrated contact center may be provided. The integrated contact center may be provided to particular end users based on the identified context, and including data generated from structured and unstructured data retrieved by the data-communications server. The integrated contact center may provide to users of a particular client station, an available selection of a virtual office assistant, contact center assistant, and a room prediction engine based on the identified context, and including data generated from the retrieved structured and unstructured data.

In some implementations, a virtual assistant is provided via the integrated contact center 113, and may include or otherwise utilize communications circuitry for communicating with respective stations including client stations associated with respective client entities (e.g., utilizing the client entity servers and/or communications systems as shown). The virtual assistant may also include or otherwise utilize a data-communications server, including circuitry, which operates with the communications circuitry to process user-data-communication between the respective stations, including one of the client stations and another one of the client stations participating in data-communications via the data-communications server. The virtual assistant may further identify context data for each user-data-communication with the one of the client stations, the context data including data indicative of at least one communications-specific characteristic associated with the user-data-communication. The virtual assistant aggregates the identified context data for the one of the client stations and applies call routing based on the aggregated context data, including routing communications from the one of the client stations to another one of the client stations.

Figure 2:
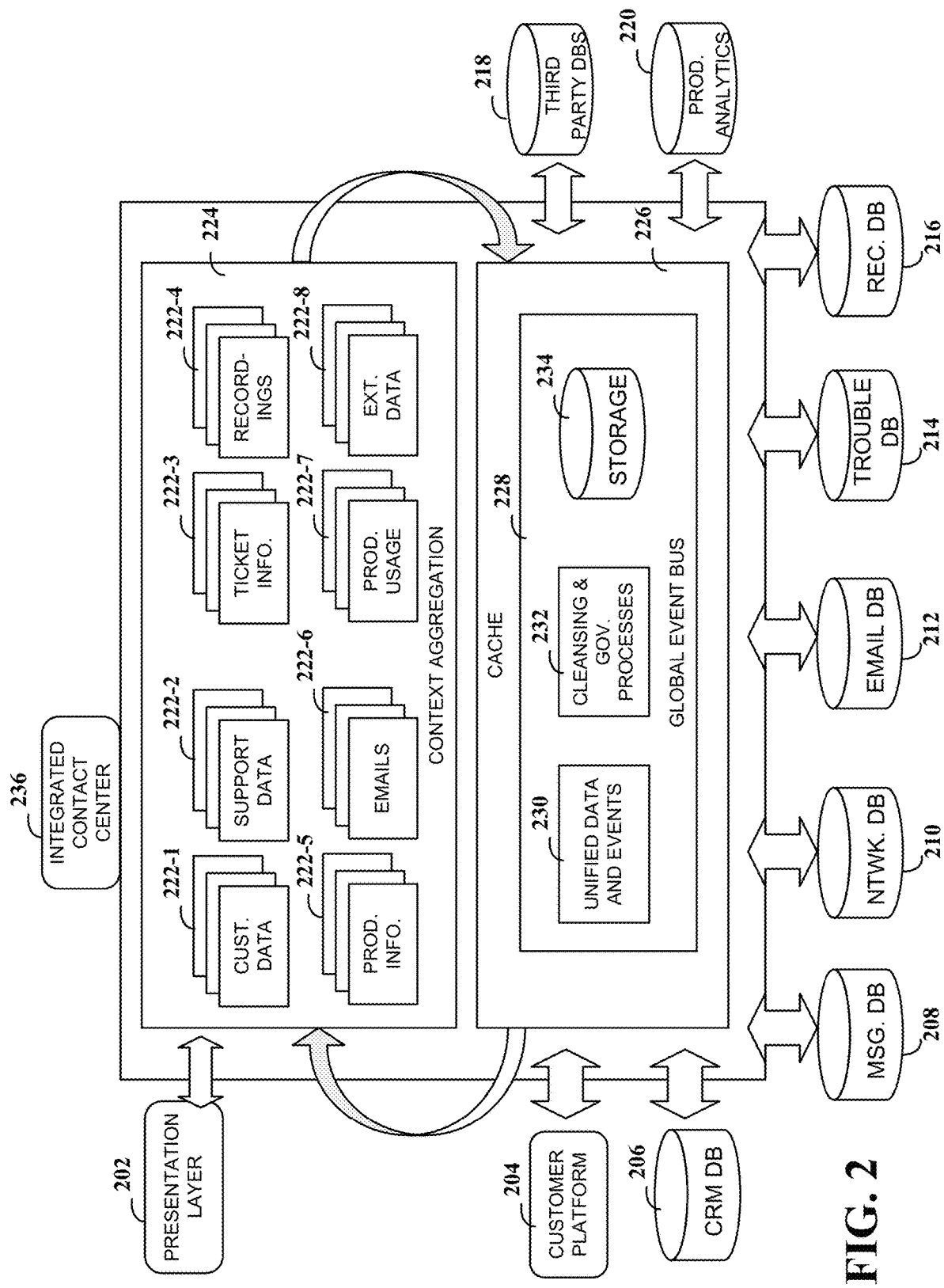
FIG. 2 illustrates a block diagram of an example system of intelligence for an integrated contact center, consistent with the present disclosure.

FIG. 2 illustrates a block diagram of an example system of intelligence for providing an integrated contact center, consistent with the present disclosure. The system of intelligence illustrated in FIG. 2 may be implemented by a data-center communications server hosted by a communications service provider, and/or by a client managed server hosted by a client of the communications service provider.

As discussed with regards to FIG. 1, each client entity may be associated with a plurality of interconnected data-communications systems. For instance, each client entity may be associated with a CRM system, an email communication system, a product sales system, a text-based communications system (e.g., chat), a technological support system, and/or a data monitoring system. Examples are not so limited, and each client entity may be associated with additional and/or different communications systems beyond those listed. Additionally, the client entity and/or the communications service provider may be communicatively coupled to external (e.g., third party) systems and/or databases.

Referring to FIG. 2, a data cache 226 may store real-time information about all interactions involving the client entity (including the other party). For instance, a global event bus 228, stored in cache 226, may identify and record each interaction and/or event involving the client entity. A unified data and events circuit 230 may store the various data and events involving the client entity, such as emails sent and received, phone calls placed and received, chat messages, etc. A cleansing and governance processes circuit 232 may process the unified data and events as appropriate based on the content of the data. For instance, different encryption and/or data handling processes may be implemented for data and events including health data and/or financial data. A storage circuit 234 may store the various events, information regarding cleansing and governance processes, and other information.

In response to an event occurrence, such as transmission or receipt of a user-data communication, the cache 226 may be updated. Particularly, the cache 226 may be updated to include an updated context based on the aggregated communications between the client entity and the other party. For instance, the cache 226 may be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user may be retrieved from each of these databases, and stored for context aggregation, such as by a context aggregation circuit 224. As an illustration, to determine a context between User 1 and Company 1, information pertaining to customer sales and billing for User 1 may be retrieved from the CRM database 206, service tickets may be retrieved from troubleshooting database 214, and transcripts of voice calls may be retrieved from the recordings database 216. Similarly, to determine a context between User 2 and Company 1, information pertaining to customer sales and billing for User 2 may be retrieved from the CRM database 206, service tickets may be retrieved from troubleshooting database 214, and transcripts of voice calls may be retrieved from the recordings database 216.

In various embodiments, data and/or information from each respective database may be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 may be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 may be stored in the context aggregation circuit 224.

Each time that an event occurs involving the client entity and the other party, the cache 226 and context aggregation circuit 224 may be updated. In various example embodiments, a presentation layer 202 may present the integrated contact center in various formats. For example, circuitry configured and arranged to communicate with the system of intelligence illustrated in FIG. 2 (e.g., the cache 226 and the context aggregation circuit 224) may present a graphical user interface on a desktop computing device, mobile computing device, and/or tablet, which visually presents the context between the client entity and the other party. The presentation layer 202 may further facilitate the presentation of the integrated contact center 236, as identified with regards to FIG. 1.

Figure 3:
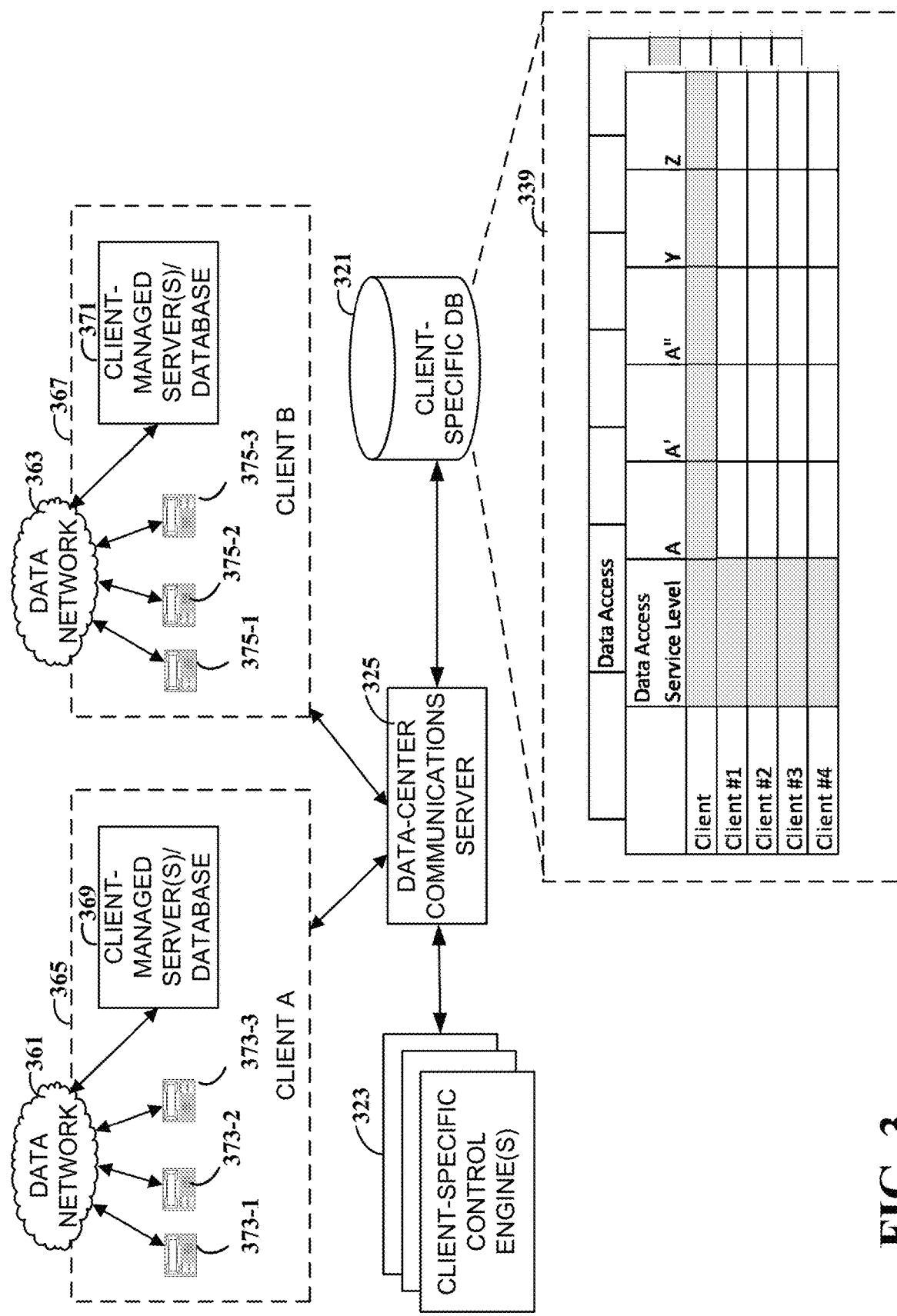
FIG. 3 illustrates a block diagram of an example data-communications system for an integrated contact center, consistent with the present disclosure.

FIG. 3 illustrates a block diagram of an example data-communications system for client-specific data-communications monitoring, consistent with the present disclosure. The system includes a data-center communications server 325 configured to provide data-communications for a plurality of endpoint devices 373-1, 373-2, 373-3, 375-1, 375-2, 375-3 connected in one or more data networks 361 and 363. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device may be respectively associated with an account of a respective client. Endpoint devices may be associated with a particular client account by registering the endpoint device with a particular client account serviced by the data-communications server. Registered devices for each client account may be listed in a respective account settings file (not shown) stored by the data-center communications server 325. In this example, endpoint devices 373-1, 373-2, and 373-3 are associated with an account 365 for a first client A and endpoint devices 375-1, 375-2, and 375-3 are associated with an account 367 for a second client B.

The system includes one or more processing circuits configured to implement client-specific control engines 323, which may be configured to adjust the data-communications provided for each client account according to a respective set of control directives. For instance, the client-specific control engines 323 may adjust a manner in which endpoint devices 373-1, 373-2, 373-3, 375-1, 375-2, and 375-3 are controlled, and/or a manner of routing of a data-communications for a client account, by generating client-specific sets of control data to the data-center communications server 325. For example, the client-specific control engines 323 may generate client-specific sets of control data by processing the respective set of control directives for the account in response to communication event data or other data prompts received from the data-center communications server 325.

As previously described, client-specific control engines 323 may be used to facilitate control of endpoint devices associated with a client device. The control of the endpoint devices may be associated with a variety of virtual office features including, for example, data-communications services such as voice over Internet Protocol (VoIP) calls, audio and/or video conferencing, internet protocol private branch exchange (IP PBX) servers, packet switching, and traffic management as well as non-data-communications services including, but not limited to, website hosting, remote data storage, remote computing services, virtual computing environments. One or more of such virtual office features may be provided, for example, by a cloud-computing network having one or more servers configurable to provide a data-communications system for a plurality of clients.

Each respective client entity may have a client-managed server and/or database. For instance, client A 365 may be associated with a client-managed server or database 369, whereas client B 367 may be associated with a client managed server or database 371. The client-managed server may facilitate the routing of data-communications between the respective endpoint devices and the data-center communications server. Similarly, the client-managed servers may analyze, in some example embodiments, the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 325 may be communicatively coupled with a client specific database 321, storing service level subscriptions 339 for each of a plurality of client entities. For example, the data-communications service provider may provide a plurality of different service levels for the clients. Each disparate service level may provide additional services and/or information to the client entity, relative to past communications handled and subsequent communications to be handled by the service provider. For example, Client A 365 and Client B 367 may be associated with a home improvement store and an adhesives manufacturer, respectively. Service level A, which can be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population may be willing to spend. Additional service levels (e.g., service level Y and service level Z illustrated in FIG. 2) may be specified. Each respective client entity (e.g., client #1 through client #4) may have a specified level of data service access provided by the data-center communications server 325.

Figure 4:
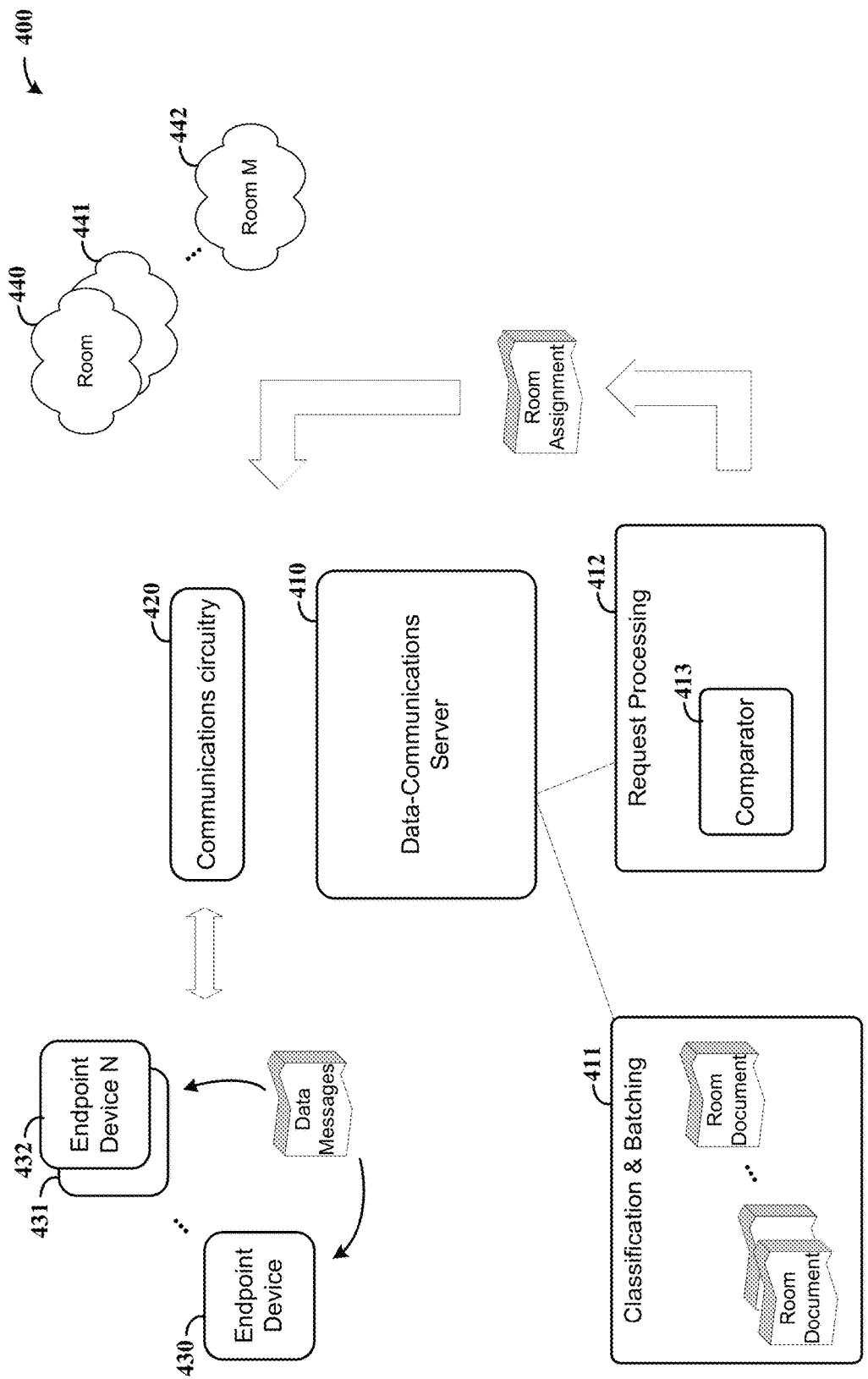
FIG. 4 illustrates an apparatus and approach for assessing and providing data-communications room recommendations, consistent with the present disclosure.

FIG. 4 illustrates an apparatus 400 and approach for assessing and providing data-communications room recommendations, consistent with the present disclosure. The apparatus 400 includes a data-communications server 410 and communications circuitry 420 that interfaces with a plurality of endpoint devices (a number of "N" devices), with endpoint devices 430-432 shown by way of example and as communicating data messages between one another. Notably, a multitude of such endpoint devices (e.g., several hundred or thousand) may communicate in this manner. Such devices may reside and/or be assigned to a particular entity, or may operate across different entities. Such communications may further be carried out using common or disparate communications providers/platforms. Each of the plurality of endpoint devices may be grouped in one or more of a plurality of data-communications rooms (a number of "M" rooms), with rooms 440-442 depicted by way of example.

The data-communications server 410 includes a classification and batching block 411, which batches data messages into room documents that characterize the rooms 440-442. The classification and batching block 410 may further classify rooms based on data in the room documents, such as to generate long-term and/or short-term classifiers as characterized herein.

The data-communications server 410 also includes a request processing block 412 that processes requests received from the endpoint devices 430-432, which may be utilized to associate the request with a particular room and/or with a particular other endpoint device (and related user) for serving the request. The request processing block 412 includes a comparator 413 configured to compare the requests for effecting the association, such as by comparing the requests to the room documents created by classification and batching block 411. This comparison may also utilize classifiers, which may be applied for matching data in the requests with data associated with each room document. For instance, vectors may be created and compared as characterized herein. When matching a request to a room for serving the request (e.g., for matching a user's technical question to a room likely to include individuals that may be able to answer the question), the request processing block 412 may output a room assignment based on the operation of the comparator 413.

Figure 5:
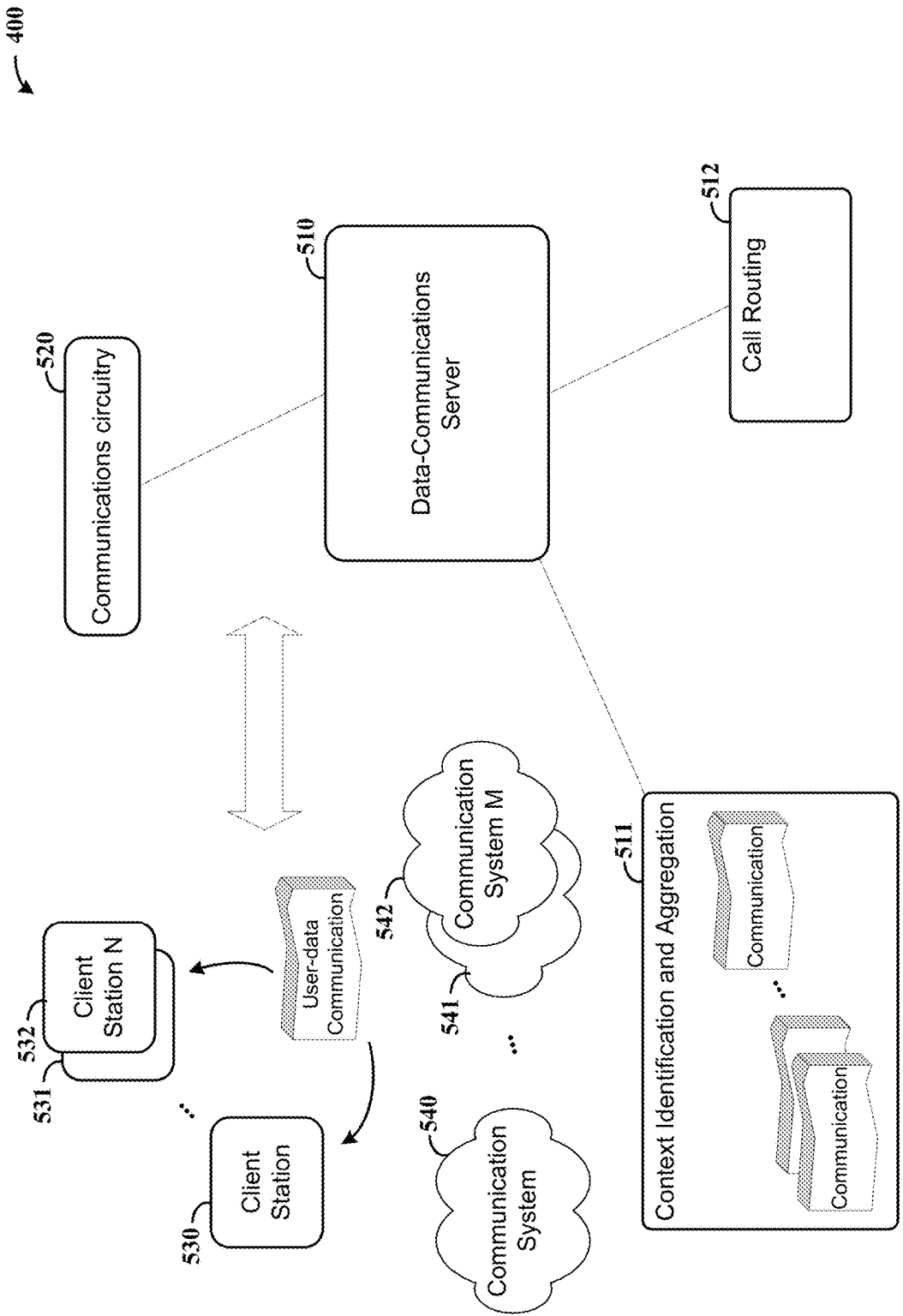
FIG. 5 shows an apparatus for assessing and facilitating communications, consistent with the present disclosure.

FIG. 5 shows an apparatus for assessing and facilitating communications, as may be implemented in accordance with one or more embodiments. The apparatus 500 includes a data-communications server 510 and communications circuitry 520 that provides communication with client stations, including stations 530, 531 and 532 (or "N" number of such stations). Each station may be associated with a particular client entity, such as for individuals making calls/connections and/or clients serving such calls/connections (e.g., for providing customer service). In some implementations, the client stations 530-532 communicate over two or more communication systems 540, 541 and 542 (or "M" number of such systems), such as cellular, VoIP and other systems, as may be utilized for different communication sessions and/or in transitioning between respective systems during a single communication session.

The data-communications server 510 includes a context identification and aggregation module 511, and a call routing module 512. The context identification and aggregation module 511 may identify context data for each user-data-communication with one of the client stations, including identifying data indicative of at least one communications-specific characteristic associated with the user-data-communication. The context identification and aggregation module may aggregate the identified context data for the one of the client stations 530-532, such as by aggregating context data for one or more communications sessions involving the client station, which may occur within one or more of the communication systems 540-542. The call routing module 512 may apply call routing based on the aggregated context data, by routing communications from the one of the client stations to another one of the client stations.

The following embodiments may be implemented with one or more of the figures, such as with the blocks/modules depicted in FIG. 5, involving apparatus(es) and/or methods relating to the indicated functionality. Context data may be identified using one or more of a variety of approaches. In certain embodiments, identifying a context may include identifying one or both of a sentiment and criticality/importance for the data-communications. For instance, a sentiment may be identified for each user-data communication among a plurality of data-communications, and used identify the context data. Criticality characteristics may be indicative of an importance of the user-data communication relative to other user-data-communications (or of particular users relative to other users, for which the communications are made). Sentiment characteristics may be indicative of a sentiment of a communication exchange with the one of the client stations. In some embodiments, word meaning is identified for voice communications in each user-data-communication. In various applications, critical calls are identified using the identified importance/criticality of a communication, such as for emergency situations or situations in which an issue has reached a threshold of importance/criticality as may relate to an issue being communicated and/or an importance level of an individual making the call. In certain embodiments, embeddings are generated for a plurality of audio clips pertaining to each user-data-communication, and a logistic regression model is trained with the generated embeddings and utilized for identifying the context data. Further, future context data may be predicted for user-data-communication with the one of the client stations, based on context data identified for current or previous user-data-communication with the one of the client stations. Accordingly, communications may be routed based on criticality and/or sentiment characteristics of the user-data communication to be routed and/or of related user-data-communications.

In some embodiments, a data-communications server (such as 510) may generate a list of a unique representations of each respective one of client entities it serves. The representation may utilize human-readable text to transmit data objects; and build the context data for each user-data-communication based on characteristics selected from the group of: caller priority assigned to the client entity for the one of the client stations, assessed criticality of the context data, assessed sentiment of the context data, background of the client entity for the one of the client stations, and a combination thereof. The data objects may include attribute values/value pairs, array data types, a serializable value, or a combination thereof.

In various embodiments, a data-communications server such as server 510 processes user-data-communication between a set of two or more client stations on disparate data communication systems (e.g., 540-542). The identified context data for each disparate data-communications system may be displayed to facilitate assessing the context between the client stations in differing communications platforms.

Certain embodiments are directed to the creation of one or more documents that characterize users, which may utilize communication stations for involvement with related communications (e.g., as depicted in FIG. 5). Such documents may include data useful for identifying a context involving the particular user, and can provide data characterizing historical interactions that can be used for identifying context for a current communication and/or for predicting context. This may relate to system users looking for help or other input, or to agents who serve system users by providing feedback and/or other resources.

Figure 6:
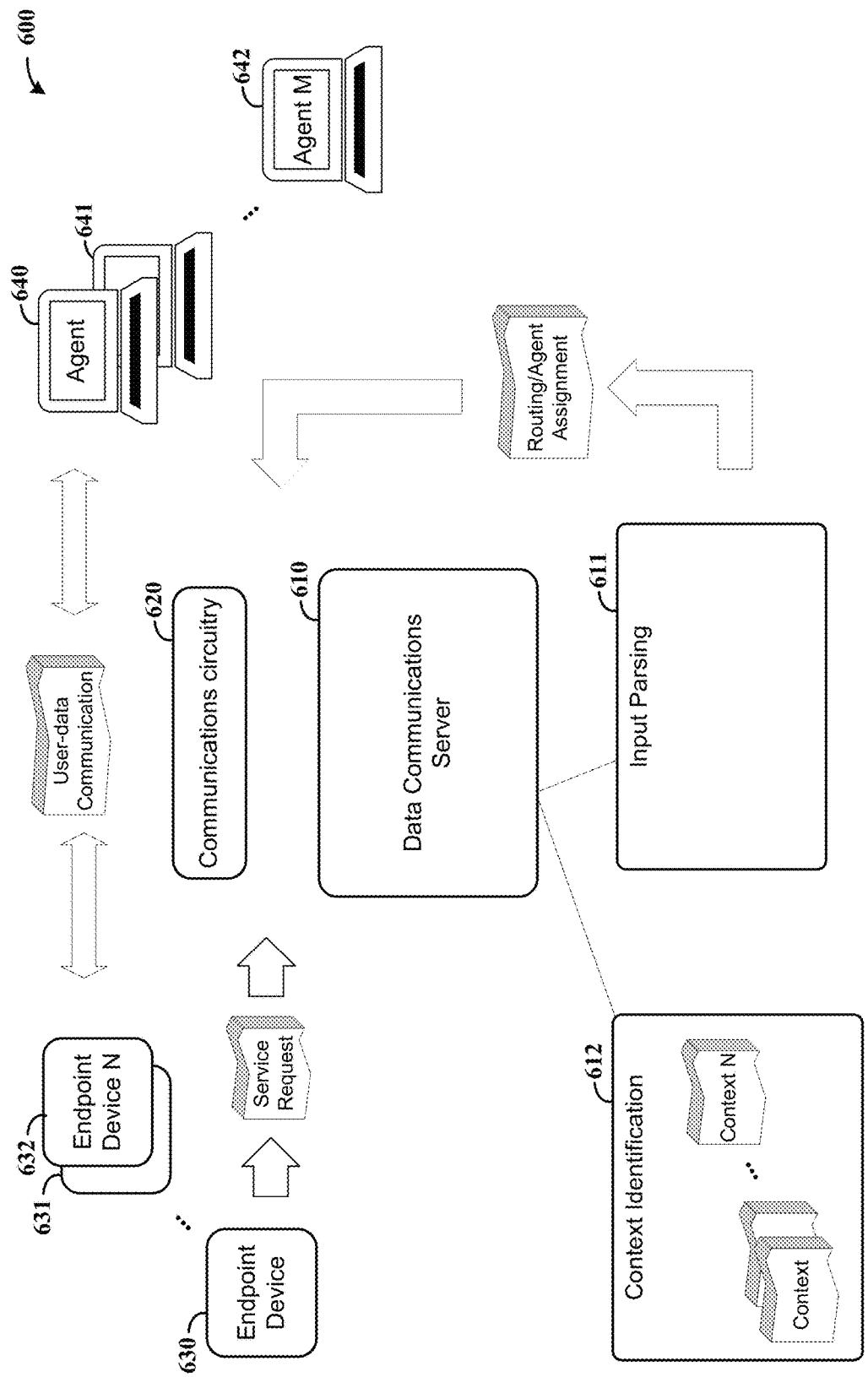
FIG. 6 shows an apparatus and approach for user-data-communications routing, as an effective virtual agent, as may be implemented in a manner consistent with the present disclosure.

FIG. 6 shows an apparatus 600 and approach for user-data-communications routing, which may effect a contact center virtual agent, and which may be further implemented in accordance with one or more embodiments. Such approaches may provide automated routing and connection decisions based on identified context information as well as input from users for which data-communications are being routed. The apparatus 600 includes a data-communications server 610 and communications circuitry 620 that communicate with respective stations, including endpoint devices 630-632 (or "N" such devices) and agent devices 640-642 (or "M" such devices). In this context, each agent device may be part of a common client station, such as for agents representing a client entity. Each agent device as shown may represent a separate client station, which may have one or more agents therein. Different ones of the agent devices may also be grouped as a particular client (and, e.g., effectively act as a client station). The data-communications server 610 operates to process user-data-communications between a client station (e.g., agent 640) and participant stations (e.g., 630-632) that participate in data-communications via the client station.

Service request data sent from users at the endpoint devices 630-632 is parsed by the data-communications server 610, at block 611, and context information is identified at block 612 based on the service request data and one or more communications-specific characteristics associated with the user-data-communications. The identified context information may be aggregated for the client station and stored, such as by aggregating information over time for various communications from a particular user and/or from groups (or all) users involving the client station.

A data-communications routing option is chosen for routing data (e.g., for each service request) involving one of the participant stations based on the service request data and the aggregated context information. The routing option may involve, for example, selection of a particular endpoint device or agent device via which the user can be serviced, such as by selecting an agent for providing service to the user from which the service request emanates. Data-communications, such as voice, text, media, or a combination thereof, are routed in accordance with the chosen data-communications routing option.

Certain embodiments are directed to the creation of one or more documents that characterize users, which may utilize communication stations for involvement with related communications (e.g., as depicted in FIG. 6). Such documents may include data useful for identifying a context involving the particular user, and can provide data characterizing historical interactions that can be used for identifying context for a current communication and/or for predicting context. This may relate to system users looking for help or other input, or to agents who serve system users by providing feedback and/or other resources.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data-communications) endpoint device (or endpoint) refers to or includes a communications circuit such as one enabled to communicate over a broadband network such as the Internet or a cellular communications network (e.g., computer) processing circuits as configured to establish data-communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed:

1. A data-communications system comprising:
 a data-communications server, including one or more client-entity-server computers that are operated on behalf of respective ones of a plurality of client entities, to provide data-communications services including an integrated contact center to particular end users by routing inbound data communications;
 at least one of the one or more client-entity-server computers to:
  process user-data communications between a plurality of respective stations, including a client station and including a participating station that participates in data-communications via data-communications services;
  identify context data for each respective user-data-communication between the client station and the participating station, the context data corresponding to at least one communications-specific characteristic associated with and discerned from one or more content-related characteristics, obtained from among words and/or media characteristics conveyed in the user-data-communications;
  aggregate the identified context data for the client station to provide aggregated context data which is based on communications sessions involving the client station; and
  provide the data-communications services including the integrated contact center to particular end users based on the aggregated context data and including data generated from retrieved data concerning previous data communications provided by the data-communications server.

2. The data-communications system of claim 1, wherein the integrated contact center provides to users of a particular client station, an available selection of one or more of the following: a virtual office assistant, a contact center assistant, and a room prediction engine based on the identified context data, and including data generated from the retrieved data.

3. The data-communications system of claim 1, wherein the retrieved data is data obtained from one of more of chat communications, calls, transcripts, service tickets, sales tickets, and call detail records.

4. The data-communications system of claim 1, wherein the integrated contact center provides to users of a particular client station a room prediction service based on the identified context data, and including data generated from the retrieved data.

5. The data-communications system of claim 1, wherein the integrated contact center provides to users of a particular client station a room prediction service by carrying out a plurality of actions including:
 for each of a plurality of data-communications rooms in which ones of the stations participate in the data-communications, batch ones of data-communications messages communicated between the stations together to create a room document; and
 identify a particular data-communications room among the plurality of data-communications rooms for a request involving one of the data communications involving the client station, based on a comparison of the room document for the particular data-communications room and the request.

6. The data-communications system of claim 1, wherein the data-communications server is to provide a virtual office assistant as one of the data-communications services by applying call routing based on the aggregated context data, including routing communications from the client station to another one of the respective stations.

7. The data-communications system of claim 1, wherein the data-communications server is to provide services corresponding to a contact center assistant by carrying out a plurality of actions including:
 obtaining input service request data from one or more of the respective stations including the participating station; and
 identifying the context data based on the service request data.

8. The data-communications system of claim 1, wherein the data-communications server is to provide services corresponding to a contact center assistant by carrying out a plurality of actions including:
 identifying the context data based on a service request data sent; and
 for a user-data-communication from one of the respective stations, choosing a data-communications routing option for routing data with the one of the respective stations based on the service request data and the aggregated context data, and causing data communications to be routed in accordance with the chosen data-communications routing option.

9. The data-communications system of claim 1, wherein the data-communications server is to:
 choose a data-communications routing option for routing data with the one of the respective stations by choosing a predefined communication for routing in response to receiving service request data specifying a question; and
 causing data communications to be routed in accordance with the chosen data-communications routing option and routing data that provides a response to the question.

10. The data-communications system of claim 1, wherein the data-communications server is to:
choose a data-communications routing option for routing data with the one of the respective stations by selecting an agent based on service request data characterizing the identified context data; and
cause data communications to be routed in accordance with the chosen data-communications routing option.

11. The data-communications system of claim 1, wherein the data-communications server is to, responsive to receipt of a request from a particular end user, identify a particular data-communications room among a plurality of data-communications rooms for a particular inquiry, based on the identified context data and structured and/or unstructured data relating to previous data-communications provided by the data-communications server.

12. The data-communications system of claim 1, wherein the data-communications server is to provide a data-communications virtual assistant based on the identified context data and using data generated or derived from the retrieved data.

13. The data-communications system of claim 1, wherein the data-communications server is to provide a data-communications virtual assistant based on the identified context data, by scheduling meetings based on the identified context data and the retrieved data.

14. The data-communications system of claim 1, wherein the data-communications server is to provide a data-communications virtual assistant based on the identified context data, by applying call routing based on the aggregated context data and the retrieved data.

15. The data-communications system of claim 1, wherein the data-communications server is to provide a contact center virtual assistant based on the identified context data, by learning from previous asked and answered questions involving a user not involved in a current one of the user-data-communications.

16. The data-communications system of claim 1, wherein the data-communications server is to provide a contact center virtual assistant based on the identified context data, by learning from previous asked and answered questions without involvement of a live agent.

17. The data-communications system of claim 1, wherein the data-communications server is to provide a contact center virtual assistant based on the identified context data, by carrying out a plurality of actions including:
identifying a context of one of the user-data communications and skills associated with a particular agent; and
matching an incoming communication with an agent based on the identified skills and the context of the incoming communication.

18. The data-communications system of claim 1, wherein the data-communications server is to provide a contact center virtual assistant based on the identified context data being generated from multiple ones of the user-data communications, by providing one or more recommendations to an agent during a communication based on the identified context data.

19. The data-communications system of claim 1, wherein the data-communications server is to provide a contact center virtual assistant based on the identified context data, by:
identifying, in real time, a topic of a data communication; and
using the identified topic to provide real time one or more recommendations on how to handle the data communication.

20. A data-communications system comprising:
a data-communications server, including one or more client-entity-server computers that are operated on behalf of respective ones of a plurality of client entities, to provide data-communications services to particular end users by routing inbound data communications;
at least one of the one or more client-entity-server computers to:
process user-data communications between a plurality of respective stations, including a client station and including a participating station that participates in data-communications via data-communications services;
identify context data for each respective user-data-communication between the client station and the participating station, the context data corresponding to at least one communications-specific characteristic associated with and discerned from one or more content-related characteristics, obtained from among words and/or media characteristics conveyed in the user-data-communications;
aggregate the identified context data for the client station to provide aggregated context data which is based on communications sessions involving the client station; and
provide the data-communications services to particular end users based on the aggregated context data and including data generated from retrieved data concerning previous data-communications provided by the data-communications server, wherein the context data is associated with a topic discerned from a data communication between the client station and the participating station, wherein the identified context data includes data indicative of the at least one communications-specific characteristic, and the aggregated context data is based on or includes an aggregation of context data from multiple ones of the user-data communications.

21. A method for use by a data-communications system, the method comprising:
providing data-communications services to particular end users, via a data-communications server including one or more client-entity-server computers that are operated on behalf of respective ones of a plurality of client entities, by routing inbound data communications;
via at least one of the one or more client-entity-server computers:
processing user-data communications between a plurality of respective stations, including a client station and including a participating station that participates in data communications via data-communications services;
identifying context data for each respective user-data-communication between the client station and the participating station, the context data corresponding to at least one communications-specific characteristic associated with and discerned from one or more content-related characteristics, obtained from among words and/or media characteristics conveyed in the user-data-communications;
aggregating the identified context data for the client station to provide aggregated context data which is based on communications sessions processed by the data-communications server and involving the client station; and
providing the data-communications services to particular end users based on the aggregated context data and including data generated from retrieved data concerning previous data communications provided by the data-communications server.

\* \* \* \* \*